US012180388B2

(12) United States Patent
Kotsakis et al.

(10) Patent No.: US 12,180,388 B2
(45) Date of Patent: Dec. 31, 2024

(54) METHOD OF TREATMENT OF A SURFACE

(71) Applicant: Conopco, Inc., Englewood Cliffs, NJ (US)

(72) Inventors: Panagiotis Kotsakis, Athens (GR); Neil James Parry, Tarporley (GB); Gordon Ramage, Dumbarton (GB); Tracy Lynn Young, Dumbarton (GB)

(73) Assignee: Conopco, Inc., Englewood Cliffs, NJ (US)

( * ) Notice: Subject to any disclaimer, the term of this patent is extended or adjusted under 35 U.S.C. 154(b) by 678 days.

(21) Appl. No.: 17/291,051

(22) PCT Filed: Nov. 5, 2019

(86) PCT No.: PCT/EP2019/080236
§ 371 (c)(1),
(2) Date: May 4, 2021

(87) PCT Pub. No.: WO2020/094641
PCT Pub. Date: May 14, 2020

(65) Prior Publication Data
US 2021/0371675 A1    Dec. 2, 2021

(30) Foreign Application Priority Data
Nov. 8, 2018    (EP) .................................. 18205274

(51) Int. Cl.
    *C09D 7/63*        (2018.01)
    *C08K 5/00*        (2006.01)
    (Continued)

(52) U.S. Cl.
    CPC .......... *C09D 5/1625* (2013.01); *C08K 5/0058* (2013.01); *C08K 5/3415* (2013.01); *C09D 5/14* (2013.01); *C09D 7/63* (2018.01)

(58) Field of Classification Search
None
See application file for complete search history.

(56) References Cited

U.S. PATENT DOCUMENTS 5,332,757 A * 7/1994 Bird ..................... C07D 405/04
                                                          514/444
5,948,917 A * 9/1999 Adachi ................ C07D 401/10
                                                          548/247
(Continued)

FOREIGN PATENT DOCUMENTS

AU       2019374439 A1    5/2021
CN         101287805 A    10/2008
(Continued)

OTHER PUBLICATIONS

Experimental and theoretical damage assessment in advance marine composites 2 (Year: 2019).*
(Continued)

*Primary Examiner* — Peter A Salamon
(74) *Attorney, Agent, or Firm* — Carter, DeLuca & Farrell, LLP; George Likourezos, Esq.

(57) ABSTRACT

A method of treatment of a marine surface to improve the resistance of the surface to fouling from a marine organism, the method comprising treatment of a surface prone to fouling from a marine organism with a composition comprising a lactam, wherein the composition comprises from 0.0005 to 5 wt. % of a lactam; wherein the surface to be treated is selected from steel, light alloy, plastic or composites; and, wherein the marine organism is *Vibrio anguillarium*, *Aspergillus brasiliensis*, and *Cellulophaga lytica* either alone or comprised in a mixture with any other marine organism; to a composition comprising the lactam and to the use of the lactam to inhibit growth of a marine organism on a marine surface, wherein the surface to be treated is selected from steel, light alloy, plastic or composites; and,
(Continued)

wherein the marine organism is *Vibrio anguillarium*, *Aspergillus brasiliensis*, and *Cellulophaga lytica* either alone or comprised in a mixture with any other marine organism; and to use of the lactam to impart anti-biofilm properties to a marine surface, wherein the surface to be treated is selected from steel, light alloy, plastic or composites.

8 Claims, 2 Drawing Sheets

(51) Int. Cl.
*C08K 5/3415* (2006.01)
*C09D 5/14* (2006.01)
*C09D 5/16* (2006.01)

(56) References Cited

U.S. PATENT DOCUMENTS

| | | | | |
|---|---|---|---|---|
| 9,586,901 | B2* | 3/2017 | Kumar | A61P 31/00 |
| 9,682,953 | B2 | 6/2017 | Kharul et al. | |
| 9,957,396 | B2 | 5/2018 | Huen et al. | |
| 2003/0162924 | A1* | 8/2003 | Vos | C08F 230/085 |
| | | | | 526/264 |
| 2003/0162942 | A1 | 8/2003 | Maclennan et al. | |
| 2017/0096391 | A1 | 4/2017 | Kumar et al. | |
| 2018/0220643 | A1* | 8/2018 | Price | C07D 207/38 |
| 2018/0228153 | A1* | 8/2018 | Price | A61Q 15/00 |

FOREIGN PATENT DOCUMENTS

| | | |
|---|---|---|
| CN | 101389615 A | 3/2009 |
| CN | 101410372 A | 4/2009 |
| CN | 103958473 A | 7/2014 |
| CN | 105017217 A | 11/2015 |
| CN | 105295558 A | 2/2016 |
| CN | 107920977 A | 4/2018 |
| CN | 107920979 A | 4/2018 |
| CN | 108024938 A | 5/2018 |
| CN | 108024939 A | 5/2018 |
| CN | 108658973 | 10/2018 |
| IN | 201721003508 | 8/2018 |
| WO | 8303804 A1 | 11/1983 |
| WO | 2007030389 A2 | 3/2007 |
| WO | WO2007030389 | 3/2007 |
| WO | WO2007085042 | 8/2007 |
| WO | 2017029070 A1 | 2/2017 |
| WO | 2017029093 A1 | 2/2017 |
| WO | 2017029104 A1 | 2/2017 |
| WO | 2017029118 A1 | 2/2017 |
| WO | WO2017029093 | 2/2017 |
| WO | WO2017029112 | 2/2017 |
| WO | WO2017029118 | 2/2017 |
| WO | WO2018091222 | 5/2018 |

OTHER PUBLICATIONS

Von R. Scheffold Und P. Dubs; Synthese von Azaprotoanemoninen; Helvetica Chimica Acta; 1967; pp. 798-808.
Kalaitzakis et al.; Methylene Blue as a Photosensitizer and Redox Agent: Synthesis of 5-Hydroxy-1H-pyrrol-2(5H)-ones from Furans; Angewandte Chemie; 2015; pp. 6283-6287; 54. issue.
Dittami et al.; Preparation of N-Alkyl Pyrrolidinones via Photocyclization of y-Keto-a,B-Unsaturated Amides; Tetrahedron letters; 1995; pp. 4197-4420; vol. 36 No. 24.
Search Report and Written Opinion in EP18205110; Feb. 15, 2019.
Search Report and Written Opinion in EP18205127; Apr. 18, 2019.
Search Report and Written Opinion in EP18205274; Apr. 18, 2019.
Search Report and Written Opinion in PCTEP2019078948; Nov. 16, 2019.
Search and Written Opinion in PCTEP2019078936; Mar. 11, 2020.
Search Report and Written Opinion in PCTEP2019080236; Mar. 11, 2020.
IPRP2 in PCTEP2019078936; Sep. 25, 2020.
Written Opinion in PCTEP2019078948; Oct. 7, 2020.
IPRP2 in PCTEP2019078948; Feb. 1, 2021.
Written Opinion in PCTEP2019080236; Sep. 18, 2020.
El-Nahhal Yasser, "Toxicity of Single and Mixtures of Antibiotics to Cyanobacteria", Journal of Environmental & Analytical Toxicology dated Jan. 2015, 8 pages; vol. 5, Issue 3.

* cited by examiner

METHOD OF TREATMENT OF A SURFACE

FIELD OF INVENTION

The invention relates to a method of treatment of a marine surface.

BACKGROUND OF THE INVENTION

Surfaces are prone to be attacked by organisms. This is especially true for marine surfaces, such as sea vessels. Some surfaces can be prone to attack to organisms that create unwanted biofilms on the surfaces. This can be described as fouling of the surface.

Once immersed in sea water, fouling of fresh surfaces occurs naturally due to three sequential and interlinked events; molecular fouling, micro fouling and macrofouling. Disrupting any of these three events can delay the onset of fouling. During molecular fouling within the first few hours at sea, the surface is covered by organic matter readily available at sea such as polysaccharides and proteins in a thin conditioning film. During microfouling, multispecies floating bacteria and unicellular organisms attach themselves to the surface first reversibly, then irreversibly, and start exuding extracellular polymeric substances (EPS) and establishing a biofilm. Early microbial biofilm attracts secondary species such as fungi, algae spores and protozoa. This is due to the presence of adhesive EPS material and increased roughness of the surface during microfouling. In the final stage of biofouling (macrofouling) the biofilm coated surface attracts macroorganisms such as larvae of barnacles, mussels, macroalgae and tubeworms There is a need to improve the resistance of marine surfaces to fouling.

SUMMARY OF THE INVENTION

We have found that treatment of a surface with a lactam improves the resistance of the surface to biofilm formation from single species found in marine environments as well as a mixture of species found in marine environments. The lactam inhibits biofilm formation from single biofilm producing organisms (such as *Vibrio anguillarium, Aspergillus brasiliensis*, and *Cellulophaga lytica*) and also from a challenge mixture of seven species commonly found in marine environments which produce biofilms on marine surfaces (*Pseudoalteromonas atlantica, Cellulophaga lytica, Shewanella algae, Cobetia marina, Vibrio anguillarium, Vibrio alginolyticus*, and *Aspergillus brasiliensis*).

The invention relates in a first aspect to a method of treatment of a marine surface to improve the resistance of the surface to fouling from a marine organism, the method comprising treatment of a surface prone to fouling from a marine organism with a composition comprising a lactam, wherein the composition comprises from 0.0005 to 5 wt. %, preferably from 0.004 to 5 wt. %, more preferably from 0.01 to 4 wt. %, most preferably from 0.01 to 1 wt. %. of a lactam; wherein the surface to be treated is selected from steel, light alloy, plastic or composites; and,
wherein the marine organism is *Vibrio anguillarium, Aspergillus brasiliensis*, and *Cellulophaga lytica* either alone or comprised in a mixture with any other marine organism.

Preferably the marine organism comprises a mixture comprising at least the following: *Pseudoalteromonas atlantica, Cellulophaga lytica, Shewanella algae, Cobetia marina, Vibrio anguillarium, Vibrio alginolyticus*, and *Aspergillus brasiliensis*.

Preferably the lactam is of formula (I) or (II):

wherein:

$R_1$ and $R_2$ are each independently selected from hydrogen, halogen, alkyl, cycloalkyl, alkoxy, oxoalkyl, alkenyl, heterocyclyl, heteroaryl, aryl and aralalkyl; and $R_3$ is selected from hydrogen, hydroxyl, alkyl, cycloalkyl, alkoxy, oxoalkyl, alkenyl, heterocyclyl, heteroaryl, cycloalkyl, aryl, aralalkyl, —C(O)CR$_6$=CH$_2$, and (CH$_2$)$_n$N$^+$(R$^a$)$_3$, where n is an integer from 1 to 16, preferably 2 to 8, and where each $R^a$ is independently H or $C_{1-4}$ alkyl;

$R_4$ and $R_5$ are independently selected from hydrogen, aryl, heterocyclyl, heteroaryl, and arylalkyl; and $R_6$ is selected from hydrogen and methyl; and $R_7$ is selected from hydrogen and —C(O)CR$_6$=CH$_2$; and preferably, at least one of $R_4$ and $R_5$ is hydrogen.

Preferably the lactam of formula (I) or (II), $R_1$, $R_4$ and $R_5$ are H; $R_3$ is H, or (CH$_2$)$_n$N$^+$(CH$_3$)$_3$, where n is an integer from 1 to 16, preferably 2 to 8; and $R_2$ is a phenyl group, or a mono-substituted phenyl group; preferably $R_2$ is selected from phenyl, 4-fluorophenyl, 2-fluorophenyl, 4-chlorophenyl, 3-chlorophenyl, 4-bromophenyl and 4-methylphenyl.

Preferably the lactam is a lactam selected from:

4-(4-chlorophenyl)-5-methylene-pyrrol-2-one

5-methylene-4-(p-tolyl)pyrrol-2-one 4-(4-bromophenyl)-5-methylene-pyrrol-2-one

-continued 4-(3-chlorophenyl)-5-methylene-
pyrrol-2-one 4-(2-fluorophenyl)-5-methylene-
pyrrol-2-one 3-(3-(4-chlorophenyl)-5-methylene-5-oxo-2,5-
dihydro-1H-
pyrrol-1-yl)-N,N,N-trimethylpropan-1-aminium
(either as cation itself or with a suitable counterion,
e.g. iodide.

More preferably the lactam is a lactam selected from:

4-(4-chlorophenyl)-5-
methylene-pyrrol-2-one;
and 5-methylene-4-(p-toly)
pyrrol-2-one.

Most preferably the lactam is:

4-(4-chlorophenyl)-
5-methylene-pyrrol-
2-one.

Preferably the lactam is delivered from an aqueous based composition, or an organic solvent based composition.

The surface to be treated is selected from steel, light alloy, plastic or composites.

Preferably the marine surface is chosen from a partially or fully submerged, static or moving structure, preferably a ship hull, a sea platform, a geo-location device, or hardware used for defence purposes.

In a second aspect, the invention relates to a composition for treatment of a marine surface, the composition comprising from 0.0005 to 5 wt. %, preferably from 0.01 to 1 wt. % of a lactam, wherein the composition is in the form of a free association paint, a self-polishing co-polymer paint or a foul release paint.

Preferably the lactam is as described above in relation to the first aspect of the invention.

More preferably, the lactam is a lactam selected from:

4-(4-chlorophenyl)-         5-methylene-4-
5-methylene-pyrrol-         (p-tolyl)pyrrol-
2-one;                      2-one;

most preferably the lactam is a lactam selected from:

4-(4-chlorophenyl)-
5-methylene-pyrrol-
2-one.

In a third aspect, the invention relates to the use of a lactam to inhibit growth of a marine organism on a marine surface; wherein the surface to be treated is selected from steel, light alloy, plastic or composites; and,
wherein the marine organism is *Vibrio anguillarium*, *Aspergillus brasiliensis*, and *Cellulophaga lytica* either alone or comprised in a mixture with any other marine organism. The invention may also relate to the use of a lactam to impart anti-biofilm properties to a marine surface; wherein the surface to be treated is selected from steel, light alloy, plastic or composites.

The marine organism comprises at least one of *Vibrio anguillarium*, *Aspergillus brasiliensis*, and *Cellulophaga lytica*. It preferably comprises at least a mixture of the following: *Pseudoalteromonas atlantica*, *Cellulophaga lytica*, *Shewanella algae*, *Cobetia marina*, *Vibrio anguillarium*, *Vibrio alginolyticus*, and *Aspergillus brasiliensis*.

Preferably the lactam is a lactam selected from:

4-(4-chlorophenyl)-
5-methylene-pyrrol-
2-one;

and 5-methylene-4-
(p-tolyl)pyrrol-
2-one;

most preferably the lactam is a lactam selected from:

4-(4-chlorophenyl)-
5-methylene-pyrrol-
2-one.

DETAILED DESCRIPTION OF THE INVENTION

The indefinite article "a" or "an" and its corresponding definite article "the" as used herein means at least one, or one or more, unless specified otherwise.

It will be appreciated that, except where expressly provided otherwise, all preferences are combinable.

Lactam

A lactam is a cyclic amide. Preferred lactams are γ-lactams which have 5 ring atoms.

Preferably the lactam is of formula (I) or (II):

(I)

(II)

wherein:

$R_1$ and $R_2$ are each independently selected from hydrogen, halogen, alkyl, cycloalkyl, alkoxy, oxoalkyl, alkenyl, heterocyclyl, heteroaryl, aryl and aralalkyl; and $R_3$ is selected from hydrogen, hydroxyl, alkyl, cycloalkyl, alkoxy, oxoalkyl, alkenyl, heterocyclyl, heteroaryl, cycloalkyl, aryl, aralalkyl, —C(O)CR$_6$=CH$_2$, and (CH$_2$)$_n$N$^+$(R$^a$)$_3$, where n is an integer from 1 to 16, preferably 2 to 8, and where each R$^a$ is independently H or $C_{1-4}$ alkyl;

$R_4$ and $R_5$ are independently selected from hydrogen, aryl, heterocyclyl, heteroaryl, and arylalkyl; and $R_6$ is selected from hydrogen and methyl; and $R_7$ is selected from hydrogen and —C(O)CR$_6$=CH$_2$; and Preferably, at least one of $R_4$ and $R_5$ is hydrogen.

It will be appreciated that, where appropriate groups may be optionally substituted. Optional substituents may include halogens, $C_{1-4}$alkyl, $C_{1-4}$haloalkyl (for example, CF$_3$) and $C_{1-4}$alkoxy.

Alkyls may, for example, be $C_{1-12}$alkyls, such as $C_{1-6}$alkyls. Aryls may, for example, be $C_{6-10}$aryls, for example, phenyls.

Preferably, at least one of $R_1$ and $R_2$ is selected from heterocyclyl, heteroaryl, aryl and arylalkyl.

Preferably, $R_1$ is hydrogen. Preferably, $R_3$ is hydrogen, or (CH$_2$)$_n$N$^+$(R$^a$)$_3$, where n is an integer from 1 to 16, preferably 2 to 8, and where each R$^a$ is independently H or $C_{1-4}$ alkyl, more preferably R$^a$ is CH$_3$; Preferably, $R_4$ is hydrogen. Preferably, $R_5$ is hydrogen. Preferably, $R_6$ is hydrogen. Preferably, $R_7$ is hydrogen. Preferably, $R_2$ is aryl or aralalkyl. More preferably, $R_2$ is a phenyl group or a substituted phenyl group, for example, a mono-substituted phenyl group. Substitution may be ortho, meta, or para. Preferred substituents include halogen and methyl. For example, and without limitation, $R_2$ may be selected from phenyl, 4-fluorophenyl, 2-fluorophenyl, 4-chlorophenyl, 3-chlorophenyl, 4-bromophenyl and 4-methylphenyl.

More preferably in the lactam of formula (I) or (II), $R_1$, $R_4$ and $R_5$ are H; $R_3$ is H, or (CH$_2$)$_n$N$^+$(CH$_3$)$_3$, where n is an integer from 1 to 16, preferably 2 to 8; and $R_2$ is a phenyl group, or a mono-substituted phenyl group; preferably $R_2$ is selected from phenyl, 4-fluorophenyl, 2-fluorophenyl, 4-chlorophenyl, 3-chlorophenyl, 4-bromophenyl and 4-methylphenyl.

Even more preferably the lactam is of formula (I), $R_1$, $R_4$ and $R_5$ are H; $R_3$ is H, or (CH$_2$)$_n$N$^+$(CH$_3$)$_3$, where n is an integer from 1 to 16, preferably 2 to 8; and $R_2$ is a phenyl group, or a mono-substituted phenyl group; preferably $R_2$ is selected from phenyl, 4-fluorophenyl, 2-fluorophenyl, 4-chlorophenyl, 3-chlorophenyl, 4-bromophenyl and 4-methylphenyl.

Where the lactam is cationic in nature, it can be used as such, or suitably with a counterion (e.g. iodide)

Preferably the lactam is a lactam selected from:

4-(4-chlorophenyl)-5-methylene-pyrrol-2-one and

5-methylene-4-(p-tolyl)pyrrol-2-one 4-(4-bromophenyl)-5-methylene-pyrrol-2-one 4-(3-chlorophenyl)-5-methylene-pyrrol-2-one 4-(2-fluorophenyl)-5-methylene-pyrrol-2-one and 3-(3-(4-chlorophenyl)-5-methylene-5-oxo-2,5-dihydro-1H-pyrrol-1-yl)-N,N,N-trimethylpropan-1-aminium.

Where the lactam is cationic in nature, the cation can be used or with a suitable counterion (e.g. iodide).

Most preferably the lactam is a lactam selected from:

4-(4-chlorophenyl)-
5-methylene-pyrrol-
2-one;

5-methylene-4-
(p-tolyl)pyrrol-
2-one.

The most preferred lactam is:

4-(4-chlorophenyl)-
5-methylene-pyrrol-
2-one.

Levels of Lactam

The lactam is present at a level of from 0.0005 to 5 wt. %. Preferably the lactam is present at a level of from 0.004 to 5 wt. %, more preferably from 0.01 to 4 wt. %, most preferably from 0.01 to 1 wt. %.

The lactam levels correspond to ppm and wt. % as follows, for example, specific levels of lactam being 0.0312 mM, 0.0625 mM, 0.125 mM, 0.25 mM, 0.5 mM, 1 mM, 2 mM would equate to levels of from ~6 ppm (0.312 mM) to 400 ppm (2 mM), and to wt. % of 0.0006 wt. % (0.0312 mM) to 0.04 wt. % (2 mM).

Compositions

Preferably the lactam is delivered from an aqueous based composition, or an organic solvent based composition.

The composition comprises from 0.0005 to 5 wt. %, preferably from 0.01 to 1 wt. % of a lactam, wherein the composition is in the form of a free association paint, a self-polishing co-polymer paint or a foul release paint.

Examples of free association paint include gloss enamel with UV filter; examples of self-polishing co-polymer include acrylic co-polymer; and examples of foul release paint include those that include a siloxane silicone.

Surface

The surface to be treated is selected from steel, light alloy, plastic or composites.

Preferably the marine surface is chosen from a partially or fully submerged, static or moving structure, preferably a ship hull, a sea platform, a geo-location device, or hardware used for defence purposes.

Marine Organism

The lactam shows particular inhibition when the marine organism is *Vibrio anguillarium, Aspergillus brasiliensis,* and *Cellulophaga lytica* either alone or comprised in a mixture with any other marine organism.

Preferably the marine organism comprises a mixture comprising at least the following: *Pseudoalteromonas atlantica, Cellulophaga lytica, Shewanella algae, Cobetia marina, Vibrio anguillarium, Vibrio alginolyticus,* and *Aspergillus brasiliensis.*

Further Ingredients

The composition may comprise further ingredients such as surfactants, chelating agents, thickeners, pH modifiers. The composition comprising the lactam may be provided in the form of a hydrophobic coating for a surface.

The invention will be further described with the following non-limiting examples.

EXAMPLES

Example 1—Preparation of Examples of Preferred Lactams

Preparation of 4-(4-chlorophenyl)-5-hydroxy-5-methylfuran-2(5H)-one 1-(4-Chlorophenyl)propan-2-one (40.00 g, 34.75 mL, 237.2 mmol), glyoxylic acid monohydrate (32.75 g, 355.8 mmol) and phosphoric acid (69.74 g, 711.7 mmol) were combined at room temperature before heating to 85° C. overnight. After cooling to room temperature, the mixture was poured into a mixture of water (500 mL) and ethyl acetate (500 mL). The layers were separated and the aqueous phase extracted with ethyl acetate (500 mL). The combined organic layers were washed with a 1:1 mixture of water and brine (2×500 mL), dried (MgSO$_4$) and concentrated under reduced pressure to yield 4-(4-chlorophenyl)-5-hydroxy-5-methylfuran-2(5H)-one (66.00 g, >100% yield) as a brown oil. The material was used in the next step without further purification.

Preparation of 4-(4-chlorophenyl)-5-hydroxy-5-methyl-1H-pyrrol-2(5H)-one 4-(4-Chlorophenyl)-5-hydroxy-5-methylfuran-2(5H)-one (66.00 g, 293.8 mmol) was dissolved in thionyl chloride (196.8 g, 120.0 mL, 1654 mmol) and heated at 40° C. for 1 hour, then 80° C. for 2 hours. The mixture was concentrated under reduced pressure and azeotroped with 2-methyltetrahydrofuran (200 mL). The residue was diluted with 2-methyltetrahydrofuran (160 mL) and this solution added to a cooled stirring mixture of 28% ammonia in water (180 mL) in 2-methyltetrahydrofuran (20 mL) at 0° C. The mixture was warmed to room temperature and stirred overnight. Water (100 mL) and ethyl acetate (200 mL) were added and the layers separated. The aqueous phase was extracted with ethyl acetate (200 mL), and the combined organic extracts dried (MgSO$_4$) and concentrated under reduced pressure. Purification by dry flash column chromatography (5-60% ethyl acetate in heptane) yielded 4-(4-chlorophenyl)-5-hydroxy-5-methyl-1H-pyrrol-2(5H)-one (23.18 g, 35% yield) as a cream coloured solid.

$^1$H NMR (400 MHz, d$_6$-DMSO) 8.55 (brs, 1H), 7.88-7.83 (m, 2H), 7.51-7.46 (m, 2H), 6.37 (d, 1H), 6.32 (s, 1H), 1.45 (s, 3H)

UPLC (Basic) 1.51/5.00 min, 100% purity, M+H$^+$224
MP 177° C.

Preparation of 4-(4-chlorophenyl)-5-methylene-1H-pyrrol-2(5H)-one

To a cooled solution of 4-(4-chlorophenyl)-5-hydroxy-5-methyl-1H-pyrrol-2(5H)-one (10.00 g, 44.51 mmol) in dry dichloromethane (100 mL) at 0° C. was added a solution of boron trifluoride diethyl etherate (8.213 g, 7.142 mL, 57.87 mmol) in dry dichloromethane (45 mL) over 15 minutes. The mixture was stirred at 0° C., before slowly warming to room temperature and stirring for 2 hours. The reaction was quenched with ice-water (100 mL) and the layers separated. The aqueous layer was extracted with dichloromethane (100 mL), and the combined organic layers washed with a 1:1 mixture of water and saturated aqueous sodium hydrogen carbonate solution (100 mL), dried (MgSO$_4$) and filtered. Silica was added to the filtrate and the mixture stirred for 10 minutes before filtering through a plug of silica, washing through with dichloromethane followed by a 3:1 mixture of dichloromethane:diethyl ether. Fractions containing the desired product were combined and concentrated under reduced pressure. Upon concentration a precipitate formed, which was collected by filtration, washing with diethyl ether, to yield 4-(4-chlorophenyl)-5-methylene-1H-pyrrol-2(5H)-one (5.25 g, 57% yield) as a cream coloured solid.

$^1$H NMR (400 MHz, d$_6$-DMSO) 10.10 (s, 1H), 7.54-7.47 (m, 4H), 6.36 (s, 1H), 5.04 (t, 1H), 4.85 (s, 1H)

UPLC (Basic) 1.87/5.00 min, 100% purity, M+H$^+$206
MP 182° C.

Preparation of 5-hydroxy-5-methyl-4-(p-tolyl)furan-2(5H)-one 1-(p-Tolyl)propan-2-one (25.00 g, 24.00 mL, 168.7 mmol), glyoxylic acid monohydrate (23.29 g, 253.0 mmol) and phosphoric acid (49.60 g, 506.1 mmol) were combined at room temperature before heating at 90° C. overnight. After cooling to room temperature, the mixture was poured into a stirring mixture of ice-water (400 mL) and ethyl acetate (400 mL). The layers were separated and the organic phase washed with water (100 mL), dried (MgSO$_4$) and concentrated under reduced pressure. The mixture was azeotroped with 2-methyltetrahydrofuran (50 mL) to yield 5-hydroxy-5-methyl-4-(p-tolyl)furan-2(5H)-one (16.50 g, 48% yield) as a brown solid.

$^1$H NMR (400 MHz, d$_6$-DMSO) 7.86 (s, 1H), 7.75 (d, 2H), 7.28 (d, 2H), 6.59 (s, 1H), 2.32 (s, 3H), 1.61 (s, 3H)

Preparation of 5-hydroxy-5-methyl-4-(p-tolyl)-1H-pyrrol-2(5H)-one

5-Hydroxy-5-methyl-4-(p-tolyl)furan-2(5H)-one (16.50 g, 80.80 mmol) was dissolved in thionyl chloride (48.06 g, 29.47 mL, 404.0 mmol) and heated at 50° C. for 1 hour, before heating at reflux for 1 hour. After cooling to room temperature, the mixture was concentrated under reduced pressure and azeotroped with 2-methyltetra-hydrofuran (2×50 mL). The residue was diluted with 2-methyltetrahydrofuran (60 mL) and this solution added to a cooled stirring mixture of 28% ammonia in water (55 mL, 808.0 mol) in 2-methyltetrahydrofuran (10 mL) at 0° C. The mixture was warmed to room temperature and stirred overnight. 2-Methyltetrahydrofuran was removed under reduced pressure, and the residue diluted with water (200 mL) and diethyl ether (100 mL) and the mixture stirred for 20 minutes at room temperature. The solids were collected by filtration and stirred in water (100 mL) and diethyl ether (50 mL) at room temperature for 10 minutes. The solids were collected by filtration and washed with water, diethyl ether and dried under vacuum at 50° C. to yield 5-hydroxy-5-methyl-4-(p-tolyl)-1H-pyrrol-2(5H)-one (10.49 g, 31% yield) as a light beige solid.

$^1$H NMR (400 MHz, $d_6$-DMSO) 8.44 (brs, 1H), 7.73 (d, 2H), 7.21 (d, 2H), 6.24 (s, 2H), 2.29 (s, 3H), 1.45 (s, 3H)

$^{13}$C NMR (400 MHz, $d_6$-DMSO) 170.4 (s, 1C), 161.1 (s, 1C), 139.8 (s, 1C), 129.7 (s, 2C), 128.9 (s, 1C), 128.2 (s, 2C), 119.1 (s, 1C), 87.8 (s, 1C), 26.7 (s, 1C), 21.5 (s, 1C)

UPLC (Basic) 1.41/5.00 min, 100% purity, M+H$^+$204

MP 178° C. Decomposition

Preparation of 5-methylene-4-(p-tolyl)-1H-pyrrol-2(5H)-one

To a cooled solution of 5-hydroxy-5-methyl-4-(p-tolyl)-1H-pyrrol-2(5H)-one (8.68 g, 42.7 mmol) in dry dichloromethane (87 mL) at 0° C. was added a solution of boron trifluoride diethyl etherate (6.85 g, 5.96 mL, 55.5 mmol) in dry dichloromethane (40 mL) over 15 minutes. After 1 hour the mixture was allowed to slowly warm to room temperature. After a further 3 hours, the reaction was diluted with dichloromethane (50 mL) and ice-water (100 mL) and stirred for 10 minutes. The layers were separated and the organic layer washed with water (100 mL), a 1:1 mixture of water and saturated aqueous sodium hydrogen carbonate solution (100 mL) and brine (100 mL) and the organic layer filtered through Celite, washing with dichloromethane. Any excess water was removed by pipette before drying the filtrate (MgSO$_4$) and concentrating under reduced pressure to a brown solid. The solids were stirred in hot dichloromethane (120 mL) for 15 minutes before slowly cooling to room temperature and then 0° C. The solids were collected by filtration to yield 5-methylene-4-(p-tolyl)-1H-pyrrol-2(5H)-one (3.87 g, 49% yield) as a yellow solid. Silica was added to the filtrate and the mixture stirred for 10 minutes before filtering through a plug of silica, washing through with dichloromethane and then a 4:1 mixture of dichloromethane:diethyl ether. The filtrate was concentrated under reduced pressure to yield 5-methylene-4-(p-tolyl)-1H-pyrrol-2(5H)-one (0.58 g, 7%) as a yellow solid. Total yield of 5-methylene-4-(p-tolyl)-1H-pyrrol-2(5H)-one (4.45 g, 56% yield).

$^1$H NMR (400 MHz, $d_6$-DMSO) 10.11 (brs, 1H), 7.35 (d, 2H), 7.25 (d, 2H), 6.25 (s, 1H), 5.01 (s, 1H), 4.85 (s, 1H), 2.31 (s, 3H)

UPLC (Basic) 1.83/5.00 min, 100% purity, M+H$^+$186

MP 200° C. Decomposition

Example 2—Microfouling Growth Inhibition by Lactam on Single Marine Organisms

The lactams used was in these experiments 4-(4-chlorophenyl)-5-methylene-pyrrol-2-one coded as (488) depicted on the left below; and 5-methylene-4-(p-tolyl)pyrrol-2-one (coded as (491) depicted on the right below:—

Fresh stock solution of lactam was prepared at 20 mM in DMSO. Lactam stock was then serially diluted in tissue culture plates in 100% ethanol first ten-fold and subsequently to the desired concentrations. Plates were then left to dry overnight in a fume hood.

Single species plates were inoculated with each 1×10$^6$ bacteria/*Aspergillus* in marine broth and left for 24 hours. Multispecies plates were inoculated with 1×10$^5$ *S. algae, V. anguillarium V. alginolyticus* and 1×10$^6$ *C. marina, A. brasiliensis, P. atlantica, C. lytica* in marine broth and left for 24 hours, 48 and 72 hours. Plates were washed twice and left overnight to dry. Crystal violet (0.05% w/v) was added for 20 minutes and destained using 100% ethanol. Biomass was measured by optical density (OD) at 570 nm.

TABLE 1

| Organism | Plate/incubation | Broth | Culture Conditions | OD 600 |
| --- | --- | --- | --- | --- |
| *Shewanella algae* - DSMZ 9167 (ATCC 51192) | MBA/24 hr | LB + 2% NaCl | 30° C. | 0.1 (1 × 10$^9$) |
| *Cobetia marina* - DSMZ 4741 (ATCC 25374) | MBA/24 hr | See below* | 30° C. | 0.1 (1 × 10$^9$) |
| *Pseudoalteromonas atlantica* DSMZ 6840 | MBA/24 hr | See below* | 30° C. | 0.1 (1 × 10$^8$) |
| *Vibrio alginolyticus* - DSMZ 2171 (ATCC 17749) | MBA/24 hr | LB + 2% NaCl | 30° C. | 0.2 (1 × 10$^9$) |
| *Vibrio anguillarium* - DSMZ 21597 (ATCC 19264) | MBA/24 hr | LB + 2% NaCl | 30° C. | 0.1 (1 × 10$^9$) |
| *Cellulophaga lytica* - DSMZ 7489 (ATCC 23178) | MBA/24 hr broth, 48 hr-72 hr | LB + 2% NaCl | 30° C. | 0.2 (1 × 10$^8$) |
| *Aspergillus brasiliensis* (niger) (ATCC 16404) | SAB/72 hr | N/A | 37° C. | count |

*Grows more consistently (OD counts after plating) when used straight from a fresh MBA plate into PBS for the biofilm
MBA is marine broth agar (zobell)

Results

Figure 1:
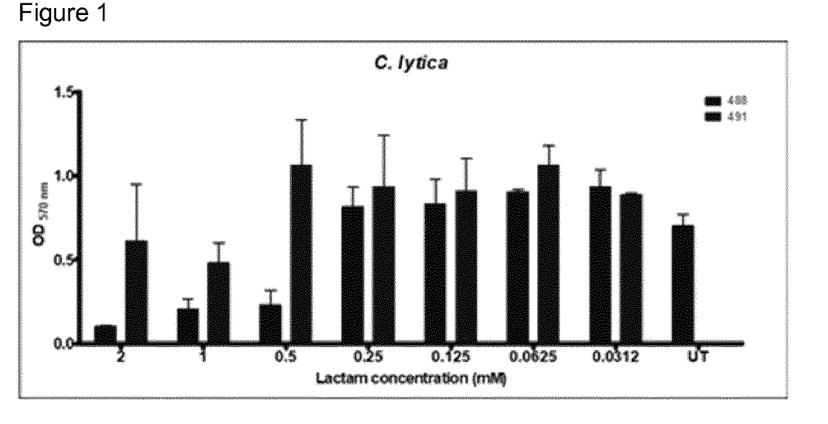
FIG. 1 relates to example 2 and is graph showing the dose response for the absorbance of crystal violet stained single marine organism *Cellulophaga lytica* culture in 24 well plates that have been pre-conditioned with different concentrations of lactams 488 and 491 (UT, untreated control) for the specific levels of lactam of 0.0312 mM, 0.0625 mM, 0.125 mM, 0.25 mM, 0.5 mM, 1 mM, 2 mM, as well as the untreated control. Two lactams are tested, 488 (left hand column) and 491 (right hand column).
Figure 2:
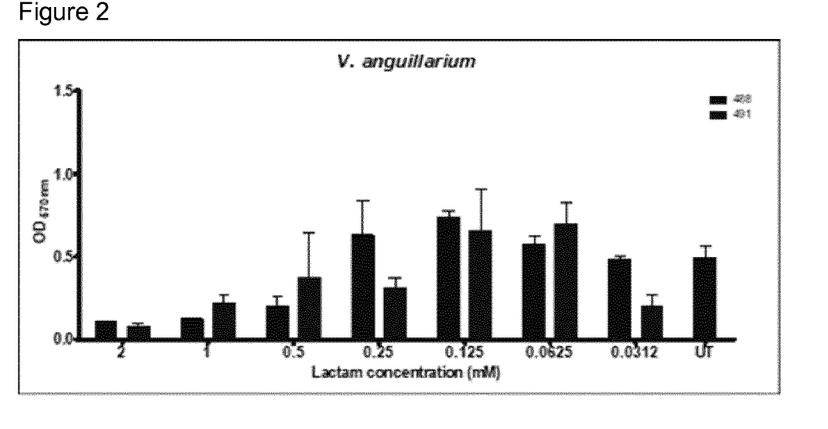
FIG. 2 relates to example 2 and is graph showing the dose response for the absorbance of crystal violet stained single marine organism *Vibrio anguillarium* culture in 24 well plates that have been pre-conditioned with different concentrations of lactams 488 and 491 (UT, untreated control) for the specific levels of lactam of 0.0312 mM, 0.0625 mM, 0.125 mM, 0.25 mM, 0.5 mM, 1 mM, 2 mM, as well as the untreated control. Two lactams are tested, 488 (left hand column) and 491 (right hand column).
Figure 3:
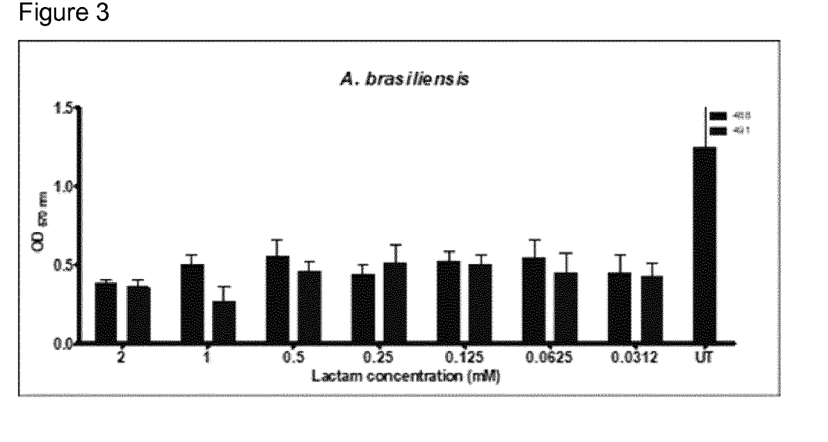
FIG. 3 relates to example 2 and is graph showing the dose response for the absorbance of crystal violet stained single marine organism *Aspergillus brasiliensis* culture in 24 well plates that have been pre-conditioned with different concentrations of lactams 488 and 491 (UT, untreated control) for the specific levels of lactam of 0.0312 mM, 0.0625 mM, 0.125 mM, 0.25 mM, 0.5 mM, 1 mM, 2 mM, as well as the untreated control. Two lactams are tested, 488 (left hand column) and 491 (right hand column).

In this experiment, the plates were treated with lactam at levels of 0.0312 mM to 2 mM as well as an untreated control. The specific levels of lactam measured were of 0.0312 mM, of 0.0625 mM, of 0.125 mM, of 0.25 mM, of 0.5 mM, 1 mM, and 2 mM. This would equate to levels of from ~6 ppm (0.312 mM) to 400 ppm (2 mM), and to wt. % of 0.0006 wt. % (0.312 mM) to 0.04 wt. % (2 mM). The lactam was provided in a DMSO/ethanol solvent to the plates. The plate was then inoculated with the marine organism or mixture thereof. The rate of growth of the culture was measured after 24 hours days by optical density. The results are shown in FIGS. 1-3 and tables 2-4.

TABLE 2

Showing the effect of the lactams on *Cellulophaga lytica* marine organism

| Test Composition | 488 Optical Density (570 nm) | 491 Optical Density (570 nm) |
| --- | --- | --- |
| Untreated Control | 0.7 | 0.7 |
| 0.0312 mM | 0.9 | 0.9 |
| 0.0625 mM | 0.9 | 1.0 |
| 0.125 mM | 0.8 | 0.9 |
| 0.25 mM | 0.8 | 0.9 |
| 0.5 mM | 0.2 | 1.0 |
| 1 mM | 0.2 | 0.5 |
| 2 mM | 0.1 | 0.6 |

The experiment in table 2 (FIG. 1) shows that the lactams had a biofilm growth inhibition effect on *Cellulophaga lytica* at lactam concentration>0.5 mM (for lactam 488) and >1 mM for lactam 491.

TABLE 3

Showing the effect of the lactams on *Vibrio anguillarium* marine organism

| Test Composition | 488 Optical Density (570 nm) | 491 Optical Density (570 nm) |
| --- | --- | --- |
| Untreated Control | 0.5 | 0.5 |
| 0.0312 mM | 0.5 | 0.2 |
| 0.0625 mM | 0.6 | 0.7 |
| 0.125 mM | 0.7 | 0.7 |
| 0.25 mM | 0.6 | 0.3 |
| 0.5 mM | 0.2 | 0.4 |
| 1 mM | 0.1 | 0.2 |
| 2 mM | 0.1 | 0.1 |

The experiment in table 3 (FIG. 2) shows that the lactams had a biofilm growth inhibition effect on *Vibrio anguillarium* at lactam concentration>0.5 mM (for both lactam 488 and 491).

TABLE 4

Showing the effect of the lactams on *Aspergillus brasiliensis* marine organism

| Test Composition | 488 Optical Density (570 nm) | 491 Optical Density (570 nm) |
| --- | --- | --- |
| Untreated Control | 1.1 | 1.1 |
| 0.0312 mM | 0.5 | 0.4 |
| 0.0625 mM | 0.6 | 0.5 |
| 0.125 mM | 0.5 | 0.5 |
| 0.25 mM | 0.4 | 0.5 |
| 0.5 mM | 0.6 | 0.5 |
| 1 mM | 0.5 | 0.3 |
| 2 mM | 0.4 | 0.4 |

The experiment in table 4 (FIG. 3) shows that the lactams had a biofilm growth inhibition effect on *Aspergillus brasiliensis* at lactam concentration>0.0312 mM (for both lactam 488 and 491).

The tested lactams did not show any significant inhibition effect for the individual *Shewanella algae, Cobetia marina, Vibrio alginolyticus,* or *Pseudoalteromonas atlantica* marine organisms under the same experimental conditions.

Example 3—Microfouling Growth Inhibition by Lactam on Marine Organism Mixtures

The lactams used was in these experiments 4-(4-chlorophenyl)-5-methylene-pyrrol-2-one coded as (488) depicted on the left below; and 5-methylene-4-(p-tolyl)pyrrol-2-one (coded as 491) depicted on the right below:—

Fresh stock solution of lactam was prepared at 20 mM in DMSO. Lactam stock was then serially diluted in tissue culture plates in 100% ethanol first ten-fold and subsequently to the desired concentrations. Plates were then left to dry overnight in a fume hood. Single species plates were inoculated with each $1\times10^6$ bacteria/*Aspergillus* in marine broth and left for 24 hours. Multispecies plates were inoculated with $1\times10^5$ *S. algae, V. anguillarium V. alginolyticus* and $1\times10^6$ *C. marina, A. brasiliensis, P. atlantica, C. lytica* in marine broth and left for 24 hours, 48 and 72 hours. Plates were washed twice and left overnight to dry. Crystal violet (0.05% w/v) was added for 20 minutes and destained using 100% ethanol. Biomass was measured by optical density (OD) at 570 nm.

Figure 4:
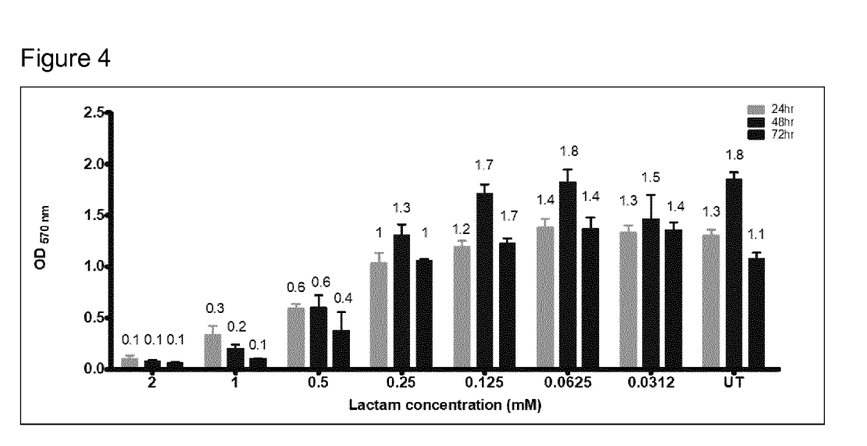
FIG. 4 relates to example 3 and is graph showing the dose response for the absorbance of crystal violet stained seven marine organisms *Pseudoalteromonas atlantica*, *Cellulophaga lytica*, *Shewanella algae*, *Cobetia marina*, *Vibrio anguillarium*, *Vibrio alginolyticus*, and *Aspergillus brasiliensis* co-culture in 24 well plates that have been pre-conditioned with different concentrations of lactam 488 (UT, untreated control) for the specific levels of lactam of 0.0312 mM, 0.0625 mM, 0.125 mM, 0.25 mM, 0.5 mM, 1 mM, 2 mM, as well as the untreated control. The results at 3 different time periods (24 hr, 48 hr and 72 hr) are shown (24 hr left most column, 48 hr middle column, 72 hr right most column).
Figure 5:
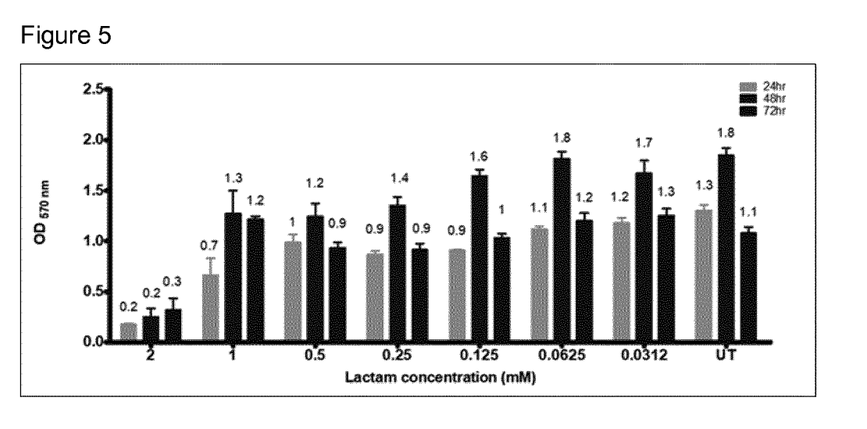
FIG. 5 relates to example 3 and is graph showing the dose response for the absorbance of crystal violet stained seven marine organisms *Pseudoalteromonas atlantica*, *Cellulophaga lytica*, *Shewanella algae*, *Cobetia marina*, *Vibrio anguillarium*, *Vibrio alginolyticus*, and *Aspergillus brasiliensis* co-culture in 24 well plates that have been pre-conditioned with different concentrations of lactam 491 (UT, untreated control) for the specific levels of lactam of 0.0312 mM, 0.0625 mM, 0.125 mM, 0.25 mM, 0.5 mM, 1 mM, 2 mM, as well as the untreated control. The results at 3 different time periods (24 hr, 48 hr and 72 hr) are shown (24 hr left most column, 48 hr middle column, 72 hr right most column).

The marine species were as used for example 2: *Shewanella algae, Cobetia marina, Vibrio alginolyticus*, or *Pseudoalteromonas atlantica, Aspergillus brasiliensis, Vibrio anguillarium*, and *Cellulophaga lytica*. This time they were used in combination as a mixture to better model the marine environment, and the growth inhibition effect of the lactams on the challenging marine organism mixture was tested. This a challenging test as the presence of marine organisms where the lactam didn't have a growth inhibition effect would be expected to lead to biofilm growth. The results are shown in FIGS. 4 and 5 and Tables 2 and 3.

TABLE 2

Showing the effect of the lactam 488 on the mixture of the 7 marine organisms

| Test Composition | 488 Optical Density (570 nm) | | |
|---|---|---|---|
| | 24 hr | 48 hr | 72 hr |
| Untreated Control | 1.3 | 1.8 | 1.1 |
| 0.0312 mM | 1.3 | 1.5 | 1.4 |
| 0.0625 mM | 1.4 | 1.8 | 1.4 |
| 0.125 mM | 1.2 | 1.7 | 1.2 |
| 0.25 mM | 1 | 1.3 | 1.0 |
| 0.5 mM | 0.6 | 0.6 | 0.4 |
| 1 mM | 0.3 | 0.2 | 0.1 |
| 2 mM | 0.1 | 0.1 | 0.1 |

For the 7 marine organism mixture, the lactam 488 inhibited biofilm growth at concentrations>0.25 mM. This proves that the lactam can inhibit growth of a marine organism on a marine surface in a true marine environment where numerous marine organisms are present, and that the lactam can impart anti-biofilm properties to a marine surface.

TABLE 3

Showing the effect of the lactam 491 on the mixture of the 7 marine organisms

| Test Composition | 491 Optical Density (570 nm) | | |
|---|---|---|---|
| | 24 hr | 48 hr | 72 hr |
| Untreated Control | 1.3 | 1.8 | 1.1 |
| 0.0312 mM | 1.2 | 1.7 | 1.3 |
| 0.0625 mM | 1.1 | 1.8 | 1.2 |
| 0.125 mM | 0.9 | 1.6 | 1.0 |
| 0.25 mM | 0.9 | 1.4 | 0.9 |
| 0.5 mM | 1.0 | 1.2 | 0.9 |
| 1 mM | 0.7 | 1.3 | 1.2 |
| 2 mM | 0.2 | 0.2 | 0.3 |

For the 7 marine organism mixture, the lactam 491 broadly (with the exception of one anomalous result at 1 mM at 72 hr) inhibited biofilm growth at concentrations>0.25 mM. This proves that a different lactam can inhibit growth of a marine organism on a marine surface in a true marine environment where numerous marine organisms are present, and that the lactam can impart anti-biofilm properties to a marine surface.

The invention claimed is:

1. A method of treatment of a marine surface to improve the resistance of the surface to fouling from a marine organism, the method comprising:

treating a surface prone to fouling from a marine organism with a composition comprising a lactam, wherein the composition is a hydrophobic coating and comprises from 0.01 to 1 wt. % of the lactam;

wherein the surface to be treated is selected from steel, light alloy, plastic or composites; and, wherein the marine organism is *Vibrio anguillarium, Aspergillus brasiliensis,* and *Cellulophaga lytica* either alone or comprised in a mixture with any other marine organism; and, wherein the lactam is selected from:

4-(4-chlorophenyl)-5-methylene-pyrrol-2-one;

5-methylene-4-(p-tolyl)pyrrol-2-one.

2. The method according to claim 1, wherein the marine organism comprises a mixture comprising at least the following: *Pseudoalteromonas atlantica, Cellulophaga lytica, Shewanella algae, Cobetia marina, Vibrio anguillarium, Vibrio alginolyticus,* and *Aspergillus brasiliensis.*

3. The method according to claim 1, wherein the lactam is:

4-(4-chlorophenyl)-
5-methylene-pyrrol-
2-one.

4. The method according to claim 1, wherein the lactam is delivered from an aqueous based composition, or an organic solvent based composition.

5. The method according to claim 1, wherein the marine surface is chosen from a partially or fully submerged, static or moving structure.

6. A composition tor treatment of a marine surface, the composition comprising:
from 0.01 to 1 wt % of a lactam, wherein the composition is hydrophobic and in the form of a free association paint, a self-polishing co-polymer paint or a foul release paint;
wherein the surface to be treated is selected from steel, light alloy, plastic or composites; and,
wherein the marine organism is *Vibrio anguillarium, Aspergillus brasiliensis,* and *Cellulophaga lytica* either alone or comprised in a mixture with any other marine organism; and
wherein the lactam is selected from:

4-(4-chlorophenyl)-
5-methylene-pyrrol-
2-one;

and

5-methylene-4-
(p-tolyl)pyrrol-
2-one.

7. A composition according to claim 6, wherein the lactam is:

4-(4-chlorophenyl)-
5-methylene-pyrrol-
2-one.

8. A method of using a lactam to inhibit growth of a marine organism on a marine surface, the method comprising:
treating the marine surface with a hydrophobic composition comprising the lactam;
wherein the surface to be treated is selected from steel, light alloy, plastic or composites; and,
wherein the marine organism is *Vibrio anguillarium, Aspergillus brasiliensis,* and *Cellulophaga lytica* either alone or comprised in a mixture with any other marine organism; and, wherein the lactam is selected from:

4-(4-chlorophenyl)-
5-methylene-pyrrol-
2-one;

and 5-methylene-4-
(p-tolyl)pyrrol-
2-one.

* * * * *